US006948317B2

(12) United States Patent
Renggli et al.

(10) Patent No.: US 6,948,317 B2
(45) Date of Patent: Sep. 27, 2005

(54) METHODS AND APPARATUS FOR FLADE ENGINE NOZZLE

(75) Inventors: Bernard James Renggli, Cincinnati, OH (US); Matthew Wilson Jumper, Cincinnati, OH (US); Kenneth Daniel Price, Hamilton, OH (US); Andrew Paul Kuchar, Chester, OH (US)

(73) Assignee: General Electric Company, Schenectady, NY (US)

( * ) Notice: Subject to any disclaimer, the term of this patent is extended or adjusted under 35 U.S.C. 154(b) by 38 days.

(21) Appl. No.: 10/698,615

(22) Filed: Oct. 31, 2003

(65) Prior Publication Data

US 2005/0091982 A1 May 5, 2005

(51) Int. Cl.[7] .................................................. F02K 1/12
(52) U.S. Cl. ...................... 60/771; 60/772; 239/265.37
(58) Field of Search ............. 60/771, 772; 239/265.33, 239/265.37, 265.39, 265.41, 265.19

(56) References Cited

U.S. PATENT DOCUMENTS 4,280,660 A * 7/1981 Wooten et al. ......... 239/265.35
4,290,262 A 9/1981 Wynosky et al.
4,361,281 A 11/1982 Nash
4,739,932 A * 4/1988 Szuminski et al. .... 239/265.33
4,978,071 A * 12/1990 MacLean et al. ...... 239/265.19
5,016,818 A * 5/1991 Nash et al. .............. 239/127.1
5,186,390 A * 2/1993 Enderle et al. ........ 239/265.37
5,261,227 A 11/1993 Giffin, III
5,261,604 A * 11/1993 Meyer ................... 239/265.19
5,402,638 A 4/1995 Johnson
5,402,963 A 4/1995 Carey et al.
5,404,713 A 4/1995 Johnson
6,000,635 A * 12/1999 Justice .................. 239/265.33

OTHER PUBLICATIONS

European Search Report dated Feb. 22, 2005, European Patent Application No. EP 04 25 5163, 3 pgs.
Pratt, GE Study Five Engine Concepts to Power High-Speed Civil Transport, Aviation Week & Space Technology, vol. 135, No. 21, Nov. 25, 1991, p. 61.

* cited by examiner

*Primary Examiner*—Ehud Gartenberg
(74) *Attorney, Agent, or Firm*—Armstrong Teasdale LLP; William Scott Andes

(57) ABSTRACT

A method for adjusting a throat area of a jet aircraft exhaust nozzle assembly includes positioning a lower structure within a substantially rectangular nozzle assembly, coupling a ramp flap to the lower structure, and coupling an outer flap to the nozzle assembly such that movement of at least one of the ramp flap and the outer flap adjusts the throat area of the nozzle assembly.

19 Claims, 5 Drawing Sheets

METHODS AND APPARATUS FOR FLADE ENGINE NOZZLE

GOVERNMENT RIGHTS STATEMENT

The United States Government may have rights in this invention pursuant to Contract No. MDA972-01-3-002.

BACKGROUND OF THE INVENTION

This invention relates generally to jet aircraft exhaust nozzles and more particularly, to methods and apparatus for adjusting a nozzle throat within a jet aircraft exhaust nozzle.

At least some known engines include either a fixed exhaust nozzle system, such as is typical of commercial subsonic engines, or a variable exhaust nozzle system, such as is typical of supersonic military aircraft. The geometry of fixed nozzle systems are not kinematically changed or variable and as such may not operate as efficiently as variable exhaust nozzle systems.

More specifically, variable geometry systems are configured to operate over a wide range of pressure ratios (P8/Pamb) by adjusting a nozzle throat (A8) based on the demands of the engine cycle, and adjusting a nozzle area ratio (A9/A8) to facilitate achieving a desired engine performance at various operating points.

In at least some known variable exhaust nozzle systems, A8 and A9/A8 control is established by "linking" A9/A8 to A8, i.e. establishing a kinematically-linked area ratio schedule. For example, at least one known engine includes a variable exhaust nozzle system that includes a circumferential series of overlapping flaps and seals that define a convergent flowpath that establishes a desired nozzle throat A8. A similar set of overlapping flaps and seals is connected to an aft end of the convergent flaps and seals and establishes a divergent portion, or an exit area (A9) of the nozzle. The divergent flaps are also kinematically-linked using a separate kinematic member, such as a compression link that is coupled to a relatively stationary part of the exhaust system, such as a duct. The resulting four bar linkage, duct, convergent flap, divergent flap, and compression link, define the kinematic relationship of the exit area A9 to the nozzle throat area A8, and thus also defines the A9/A8 schedule as a function of A8. Such an arrangement typically results in an A9/A8 schedule which increases as A8 increases.

However, the use of an overlapping flap and seal structure in the nozzle design may result in numerous leakage paths which may cause a corresponding decrease in engine operating efficiency. Additionally, the relatively large quantity of parts used to fabricate the nozzle may increase the cost, weight, and maintenance of such engines.

BRIEF SUMMARY OF THE INVENTION

In one aspect, a method for assembling an exhaust nozzle assembly is provided. The method includes positioning a lower structure within a substantially rectangular nozzle assembly, coupling a ramp flap to the lower structure, and coupling an outer flap to the nozzle assembly such that movement of at least one of the ramp flap and the outer flap adjusts the throat area of the nozzle assembly.

In another aspect, an exhaust nozzle assembly is provided. The nozzle assembly includes a lower structure positioned within a substantially rectangular nozzle assembly, a ramp flap coupled to the lower structure, and an outer flap coupled to the nozzle assembly, at least one of the ramp flap and the outer flap configured to adjust a throat area of the nozzle assembly.

In a further aspect, a gas turbine engine is provided. The gas turbine engine includes a flade rotor producing a flade discharge airflow, and a substantially rectangular flade nozzle assembly configured to receive the flade discharge airflow. The flade nozzle includes a lower structure positioned within the flade nozzle assembly, a ramp flap coupled to the lower structure, and an outer flap coupled to the nozzle assembly, at least one of the ramp flap and the outer flap configured to adjust a throat area of the flade nozzle assembly.

DETAILED DESCRIPTION OF THE INVENTION

Figure 1:
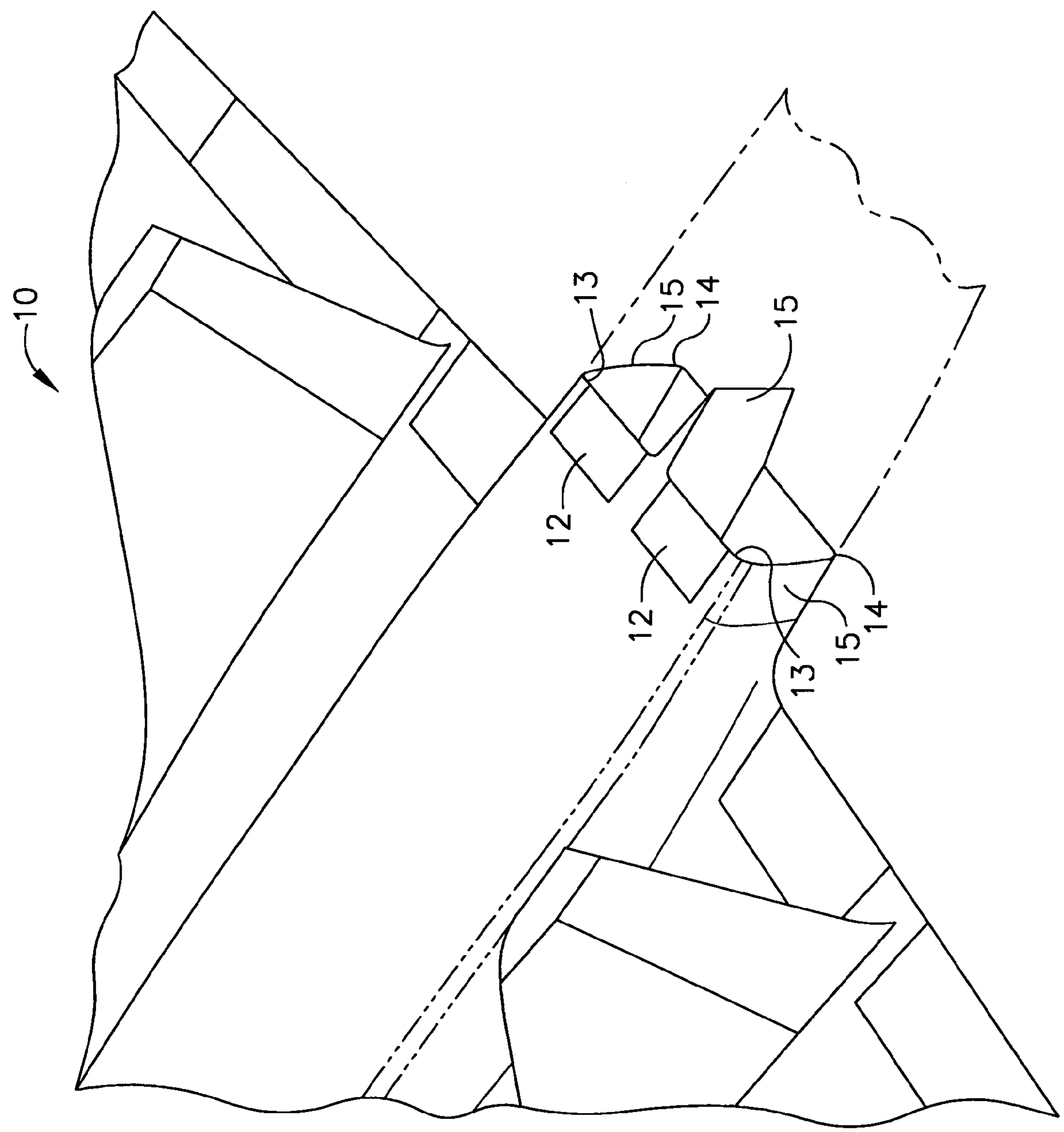
FIG. 1 is an end view of an aircraft including an exemplary engine.

FIG. 1 is a schematic illustration of a portion of a jet aircraft 10 including a plurality of engines (not shown) and a plurality of nozzle assemblies 12. Each nozzle assembly 12 includes an upper portion 13, a lower portion 14, and a plurality of sidewalls 15 that are coupled together. In the exemplary embodiment, each nozzle assembly 12 has a substantially rectangular cross-sectional profile.

Figure 2:
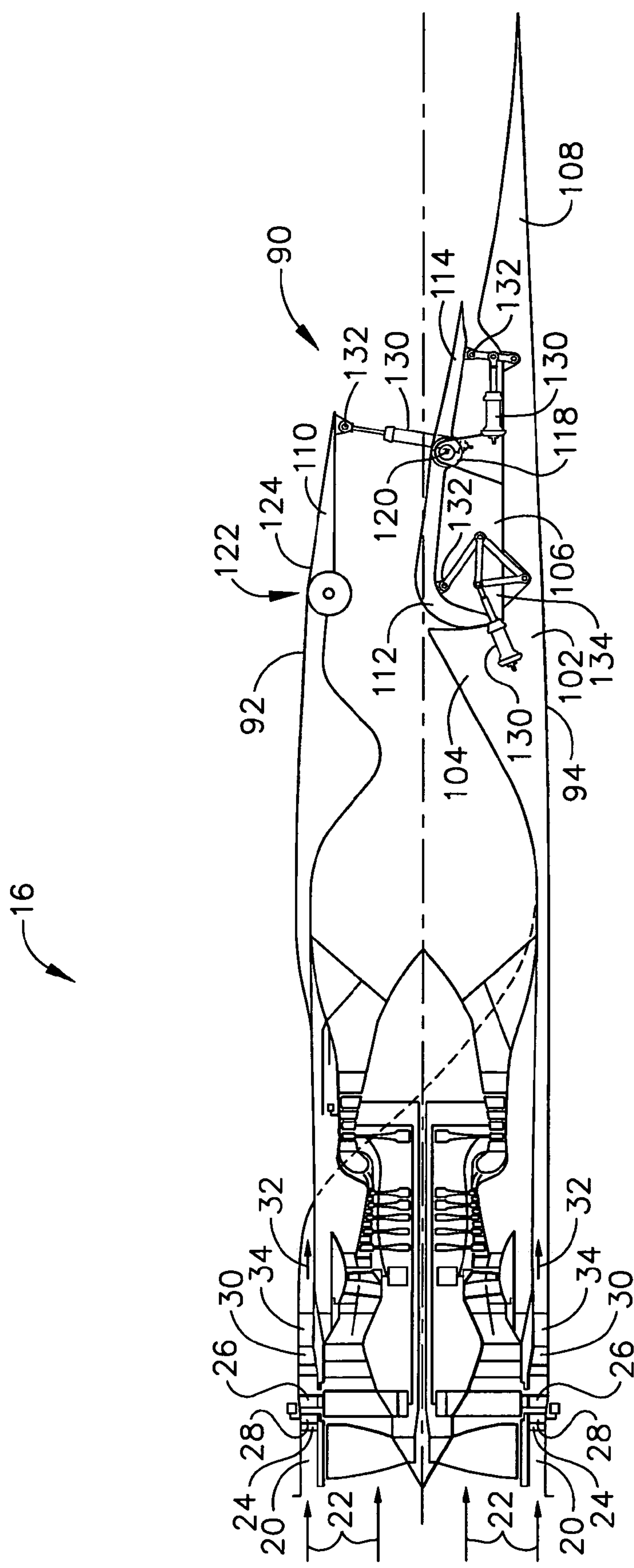
FIG. 2 is a schematic illustration of an exemplary FLADE engine that may be used with the jet aircraft shown in FIG. 1.

FIG. 2 is a schematic illustration of an exemplary "fan-on-blade" or FLADE engine 16 that may be used with jet aircraft 10 (shown in FIG. 1). Engine 16 includes a flade inlet 20 through which a relatively large percentage of an engine inlet airflow 22 enters during predetermined engine operations, such as during an aircraft takeoff. Airflow 22 enters flade inlet 20 and passes between an array of variable area inlet guide vanes 24. As illustrated in FIG. 2, inlet guide vanes 24 are actuated to their open position to direct large amounts of airflow toward a flade rotor 26.

Inlet guide vanes 24 control the volume of airflow entering a flade flowpath 28 and direct the airflow at a proper angle onto flade rotor 26 wherein the airflow is compressed and accelerated. Airflow discharged from flade rotor 26 passes through a plurality of outlet guide vanes 30 which straighten the airflow and reduce its rotary velocity component. Flade discharge airflow 32 flows through a scroll duct 34 toward a convergent/divergent flade exhaust nozzle 90.

Figure 3:
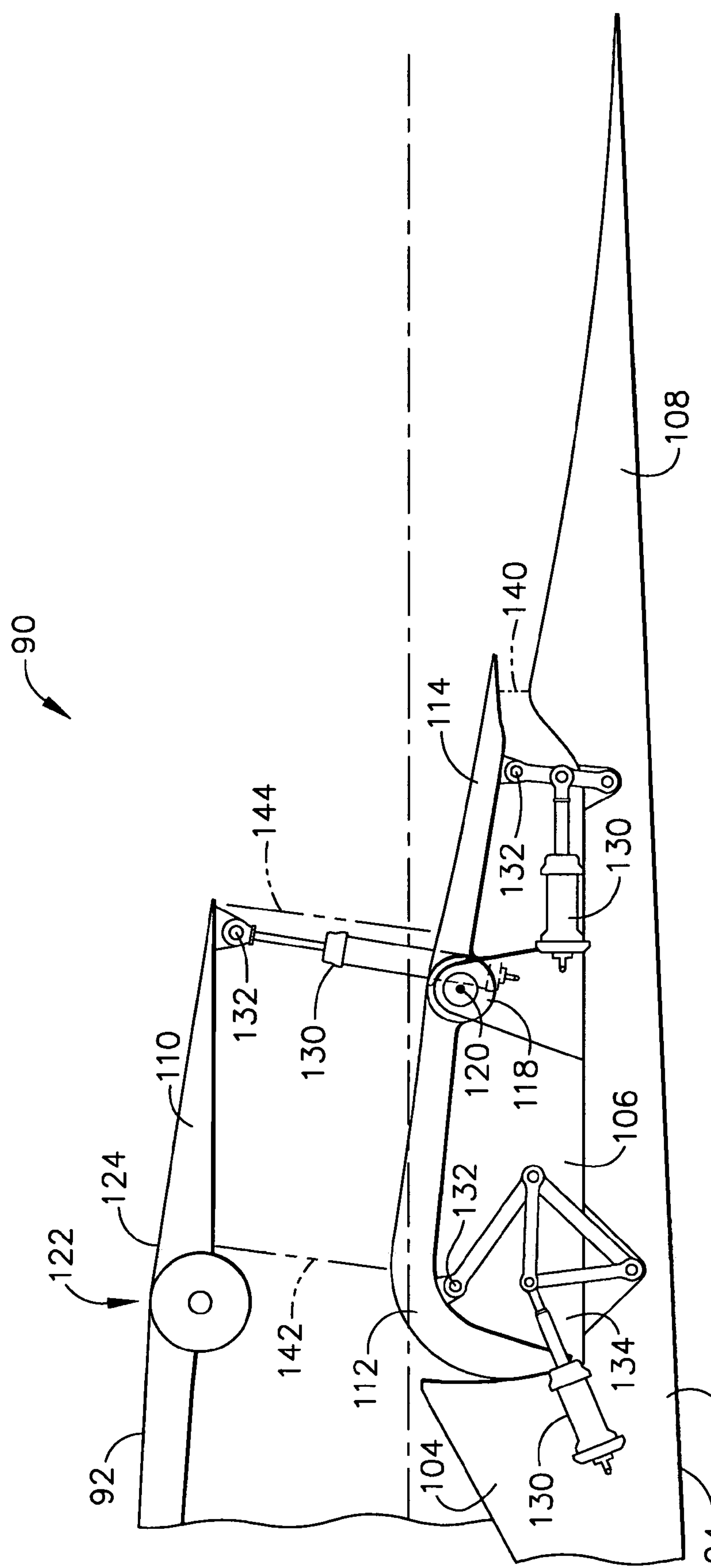
FIG. 3 is an enlarged schematic view of an exemplary nozzle system that may be used with the jet aircraft 10 shown in FIG. 1.
Figure 4:
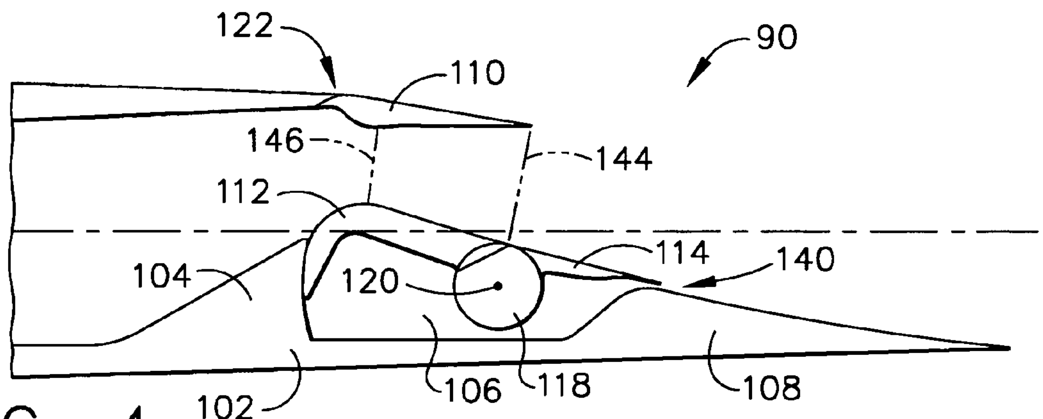
FIG. 4 is a side view of the nozzle system shown in FIG. 3 positioned for a different engine operational setting.
Figure 5:
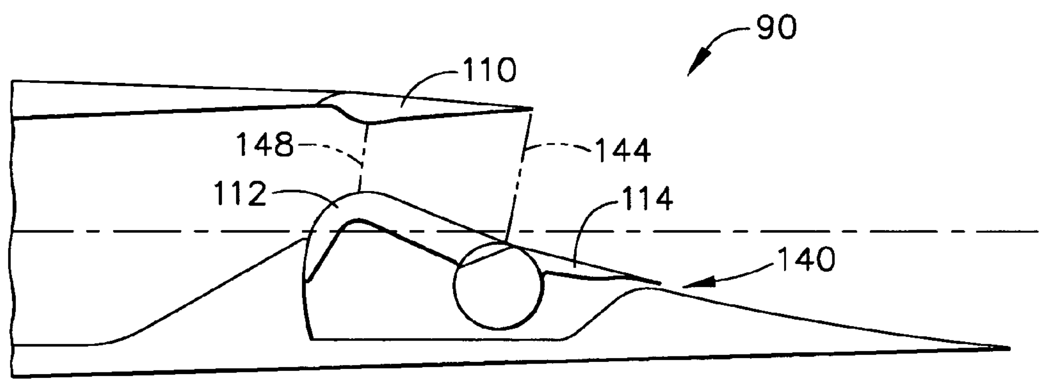
FIG. 5 is a side view of the nozzle system shown in FIG. 3 positioned for yet another engine operational setting.

FIG. 3 is an enlarged schematic view of an exemplary nozzle system 90 that may be used with jet aircraft 10 (shown in FIG. 1). FIG. 4 is a side view of nozzle system 90 positioned for a different engine operational setting. FIG. 5 is a side view of nozzle system 90 positioned for yet another engine operational setting. In the exemplary embodiment, nozzle 90 includes an upper portion 92, a lower portion 94, and a plurality of sidewalls (not shown) that are coupled together to form a substantially rectangular nozzle area. Nozzle 90 also includes a relatively large lower structure 102 that is coupled to nozzle lower portion. Lower structure 102 includes an internally-formed forward portion 104, a center recessed portion 106, and a stationary aft portion 108. Nozzle 90 also includes an outer flap 110, a ramp flap 112, and a flade flap 114.

In one embodiment, ramp flap 112 and flade flap 114 are mechanically coupled with a hinge 118, such that ramp flap 112 and flade flap 114 are rotatable about a central axis 120 of hinge 118. Outer flap 110 includes a hinge 122 that is coupled between a first end 124 of flap 110 and a portion of nozzle assembly 90 such as, but not limited to, upper portion 92 and the sidewalls.

In one embodiment, actuation of various flaps, i.e. outer flap 110, a ramp flap 112, and a flade flap 114, is accomplished using various mechanical devices. For example, outer flap 110 may be actuated using hinge 122, while ramp flap 112 and flade flap 114 may be actuated through hinge 118. In one embodiment, outer flap 110, ramp flap 112, and flade flap 114 are each coupled to an actuator 130. In another embodiment, outer flap 110, ramp flap 112, and flade flap 114 are each coupled to each respective actuator 130 through a respective mechanical linkage 132. Because the flade stream flowing through a flade passage 134 is relatively cool, actuators 130 and actuation linkages 132 for ramp flap 112 and flade flap 114 can be located within flade passage 134, i.e. within a cavity defined between ramp flap 112, flade flap 114 and lower structure 102.

In use, flade flap 114 controls a flade throat area 140, also referred to herein as A98, to substantially match engine 16 cycle demands. Ramp flap 112, positioned upstream of flade-flap 114, is movable to variably adjust a throat area 142, also referred to herein as A8, of the engine mixed core/fan stream. Outer flap 110, located on an upper surface of nozzle 90, is rotably pivotable about hinge 122 to adjust a nozzle exit area 144, also referred to herein as A9i, of nozzle 90. Accordingly, nozzle 90 includes three independently controlled nozzle surfaces, outer flap 110, ramp flap 112, and flade flap 114, which are adjusted to enable engine 16 to operate within a wide range of cycle-demanded operating conditions A8 and A98, and to generate A9i to facilitate optimizing nozzle performance.

In FIG. 3, outer flap 110, ramp flap 112, and flade flap 114 are positioned in a "takeoff" position. Specifically, ramp flap 112 has been rotated around central axis 120 to increase throat area 142, and flade flap 114 has been rotated around central axis 120 to increase flade throat area 140. As a result, a first sized throat area 142 is defined to approximately match a fan backpressure requirement during takeoff.

In FIG. 4, outer flap 110, ramp flap 112, and flade flap 114 are positioned for "transonic climb" engine operation. Specifically, ramp flap 112 has been rotated around central axis 120 to decrease throat area 142, flade flap 114 has been rotated around central axis 120 to decrease flade throat area 140. As a result, a second sized throat area 146 is defined that is smaller than first defined throat area 142. As a result, second sized throat area 146 is defined to approximately match the fan backpressure requirement during transonic climb. Additionally, outer flap 110 is positioned such that nozzle exit area 144 is sized to optimize nozzle performance, i.e. sizing A9/A8 such that nozzle performance is maximized.

In FIG. 5, outer flap 110, ramp flap 112, and flade flap 114 are positioned for a "supersonic cruise" engine operation. Specifically, ramp flap 112 has been rotated around central axis 120 to substantially decrease throat area 142, and flade flap 114 has been rotated around central axis 120 to substantially decrease flade throat area 140. As a result, a third sized throat area 148 is defined that is smaller than first sized throat area 142 to approximately match the fan backpressure requirement during supersonic cruise. Additionally, outer flap 110 is positioned such that nozzle exit area 144 is sized to optimize nozzle performance, i.e. sizing A9/A8 such that nozzle performance is maximized.

Figure 6:
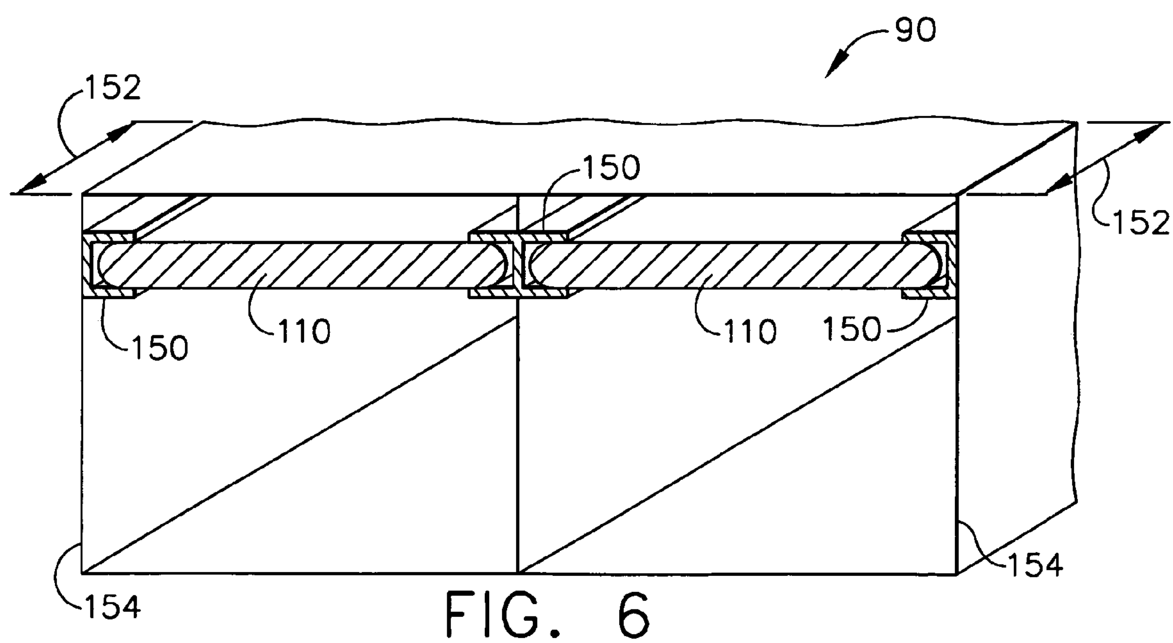
FIG. 6 is an end view of an alternative exemplary nozzle system that may be used with the jet aircraft shown in FIG. 1.

FIG. 6 is an end view of an alternative exemplary nozzle system 90 that may be used with jet aircraft 10 (shown in FIG. 1). Within nozzle system 90, instead of being hinged, outer flap 110 is coupled within a plurality of tracks 150 and translated in a forward and aft direction 152. Guide tracks 150 are mechanically coupled to at least one sidewall 154. In use, outer flap 110 is translated in the forward and aft direction using an actuation system such as, but not limited to actuator 130 and linkage 132 (shown in FIG. 3).

Figure 7:
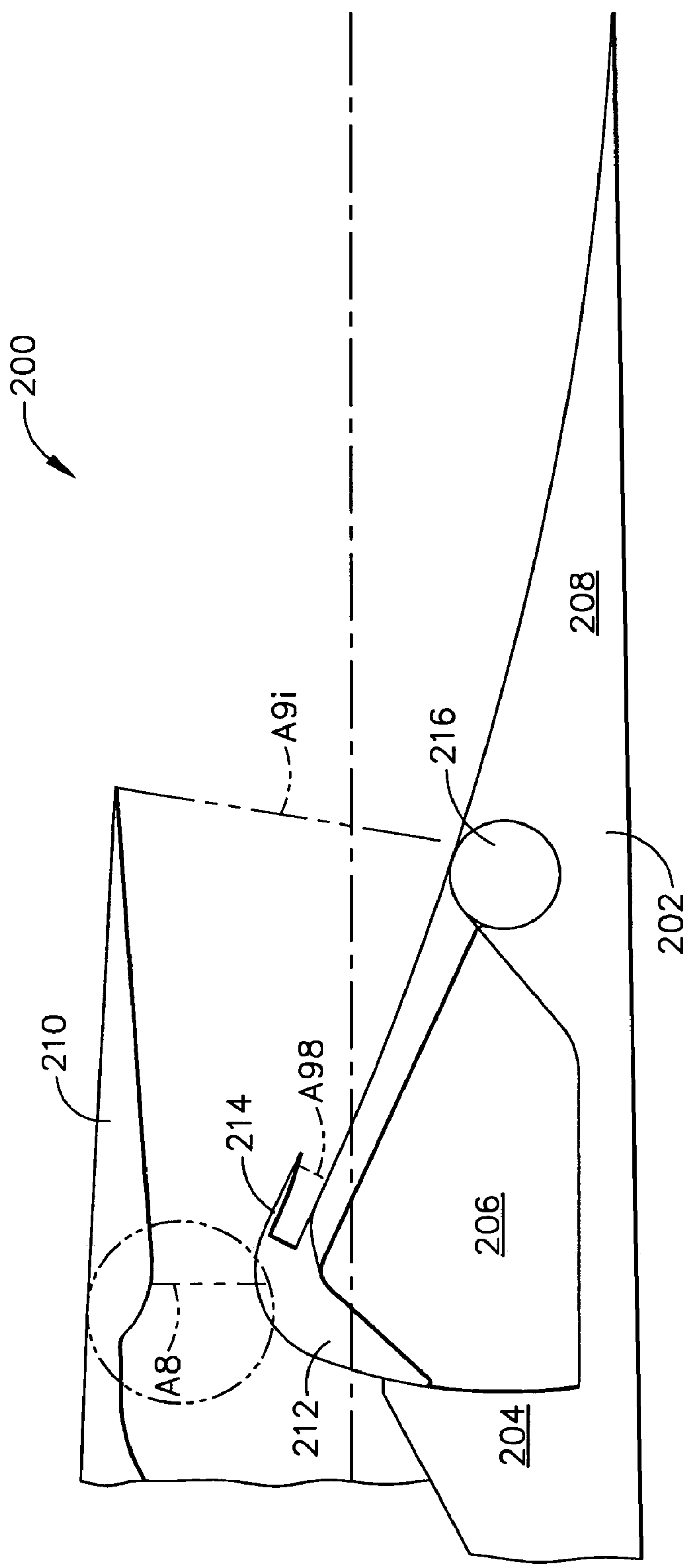
FIG. 7 is another exemplary embodiment of a nozzle system that may be used with the jet aircraft shown in FIG. 1.

FIG. 7 is another exemplary embodiment of a nozzle system 200 that can be used with jet aircraft 10, (shown in FIG. 1). Nozzle system 200 includes a lower structure 202 including a forward portion 204, a middle recessed portion 206, and a stationary aft portion 208. Nozzle 200 also includes an outer flap 210 and a ramp flap 212. Ramp flap 212 includes a flade flap 214 formed unitarily with ramp flap 212. Lower structure 202 also includes a hinge 216 mechanically coupled to ramp flap 212 such that ramp flap 212 rotably pivots about hinge 216.

In another exemplary embodiment, sidewalls 154, in a region where ramp flap 112, 212 and flade flaps 114, 214 contact them, are configured to approximate a surface of revolution described by rotating the edge of ramp flap 112, 212 and flade flaps 114, 214 about their respective hinge axis. For example, the portion of sidewalls 154 that interface with outer flap 110, 210, in the case of the pivoting outer flap embodiment approximate the surface of revolution described by rotating the edge of outer flap 110 about its hinge axis. In the case of translating outer flap 210, there is less restriction on sidewall shaping, therefore sidewall 154 is configured to maintain a good seal as outer flap 210 translates through its range of motion. Otherwise, the only restriction on shaping the areas of sidewalls 154 which do not interface with ramp-flap 112, outer-flap 110, or flade-flap 114 is it should be done in a way that does not adversely impact aerodynamic or low observable (LO) performance.

In another exemplary embodiment, engine 16 (shown in FIG. 2) does not include a flade stream, therefore a portion of the fan air is directed into what is currently shown as the flade stream, thus providing cooling air for lower structure 102 and 202 respectively. In an alternative embodiment, if no ramp cooling is desired, flade flap 114, 214 can be eliminated and stationary lower structure 208 begins at ramp-flap 112, 212 hinge joint.

Although the embodiments described herein describe a nozzle assembly having a simple rectangular cross section, it should be realized that lower structure 102, 202, ramp-flap 112, 212, flade-flap 114, 214, and outer-flap 110, 210 can be contoured across the span to create various cross sections which may have structural or other aircraft installation benefits.

The above-described nozzle systems are cost-effective and highly reliable. Nozzle system 90 includes three independently controlled nozzle surfaces, outer flap 110, ramp flap 112, and flade flap 114, which are adjusted to match the cycle-demanded A8 and A98 and generate the A9i which produces the optimal nozzle performance. As a result, the relatively small quantity of parts used to fabricate the nozzle can result in a decrease in the cost, weight, and maintenance of the engine.

Exemplary embodiments of nozzle systems are described above in detail. The nozzle systems are not limited to the specific embodiments described herein, but rather, components of each assembly may be utilized independently and separately from other components described herein. For example, each flade flap, ramp flap, and outer flap can also be used in combination with other nozzle assembly components described herein.

While the invention has been described in terms of various specific embodiments, those skilled in the art will recognize that the invention can be practiced with modification within the spirit and scope of the claims.

What is claimed is:

1. A method for assembling an exhaust nozzle, said method comprising:

positioning a lower structure within a substantially rectangular nozzle lower assembly, said nozzle having an exit area and a throat area;

rotatably coupling a single ramp flap within said nozzle to the lower structure;

rotatably coupling a single outer flap to the nozzle assembly such that movement of the ramp flap and the outer flap adjusts the throat area of the nozzle assembly;

said outer flap comprising an external surface of said nozzle.

2. A method in accordance with claim 1 further comprising coupling a flade flap to the lower structure such that the flade flap adjusts a flade throat area of the nozzle assembly.

3. A method in accordance with claim 2 further comprising:

hingedly coupling the ramp flap to the lower structure; and hingedly coupling a flade flap to the lower structure.

4. A method in accordance with claim 2 further comprising:

positioning a plurality of actuators within a flade passage such that movement of at least one of the ramp flap and the flade flap is controlled by the actuators.

5. A method in accordance with claim 1 wherein said coupling an outer flap to the nozzle assembly comprises:

coupling the outer flap to the nozzle assembly using a hinge; and coupling an actuator to the outer flap such that movement of the outer flap is controlled by the actuator.

6. A method in accordance with claim 1 wherein said coupling a ramp flap to the lower structure comprises coupling a ramp flap including a flade flap formed unitarily with the lower structure.

7. A exhaust nozzle assembly comprising:

an exit area and a throat area;

a lower structure positioned within a substantially rectangular nozzle lower assembly;

a single ramp flap rotatably coupled within said nozzle to said lower structure; and a single outer flap rotatably coupled to said nozzle assembly, at least one of said ramp flap and said outer flap configured to adjust a throat area of said nozzle assembly;

said outer flap comprising an external surface of said nozzle.

8. An exhaust nozzle assembly in accordance with claim 7 further comprising a flade flap coupled to said lower structure, said flade flap configured to define a flade throat area of said nozzle assembly.

9. An exhaust nozzle assembly in accordance with claim 8 further comprising a hinge configured to rotatably couple said ramp flap and said flade flap to said lower structure.

10. An exhaust nozzle assembly in accordance with claim 8 further comprising a plurality of actuators positioned within a flade passage, said actuators configured to move at least one of said ramp flap and said flade flap.

11. An exhaust nozzle assembly in accordance with claim 7 further comprising:

a hinge configured to couple said outer flap to said nozzle assembly; and an actuator coupled to said outer flap such that movement of said outer flap is controlled by said actuator.

12. An exhaust nozzle assembly in accordance with claim 7 wherein said ramp flap is formed unitarily with a flade flap.

13. A gas turbine engine comprising:

a flade rotor producing a flade discharge flow;

a substantially rectangular flade nozzle assembly configured to receive said flade discharge airflow, said flade nozzle comprising:

an exit area and a throat area;

a lower structure positioned within said flade nozzle lower assembly;

a single ramp flap rotatably coupled within said nozzle to said lower structure; and a single outer flap rotatably coupled to said nozzle assembly, at least one of said ramp flap and said outer flap configured to adjust a throat area of said flade nozzle assembly;

said outer flap comprising an external surface of said nozzle.

14. A gas turbine engine in accordance with claim 13 further comprising a flade flap coupled to said lower structure, said flade flap configured to define a flade throat area of said flade nozzle assembly.

15. A gas turbine engine in accordance with claim 14 further comprising a hinge configured to rotatably couple said ramp flap and said flade flap to said lower structure.

16. A gas turbine engine in accordance with claim 13 further comprising a ramp flap formed unitarily with a flade flap.

17. A method for assembling an exhaust nozzle, said method comprising:

positioning a lower structure within a substantially rectangular nozzle lower assembly, said nozzle having an exit area and a throat area;

rotatably coupling a single ramp flap within said nozzle to the lower structure;

coupling a single outer flap to the nozzle assembly such that movement of the ramp flap and the outer flap adjusts the throat area of the nozzle assembly;

wherein said coupling an outer flap to the nozzle assembly comprises slidably coupling the outer flap to the nozzle assembly using a plurality of tracks coupled to the nozzle assembly;

said outer flap comprising an external surface of said nozzle.

18. A exhaust nozzle assembly comprising:

an exit area and a throat area;

a lower structure positioned within a substantially rectangular nozzle lower assembly;

a single ramp flap rotatably coupled within said nozzle to said lower structure; and a single outer flap coupled to said nozzle assembly, at least one of said ramp flap and said outer flap configured to adjust a throat area of said nozzle assembly;

a plurality of tracks coupled to said nozzle assembly, said tracks configured to slidably couple said outer flap to said nozzle assembly;

said outer flap comprising an external surface of said nozzle.

19. A gas turbine engine comprising:

a flade rotor producing a flade discharge flow;

a substantially rectangular flade nozzle assembly configured to receive said flade discharge airflow, said flade nozzle comprising:

an exit area and a throat area;

a lower structure positioned within said flade nozzle lower assembly;

a single ramp flap rotatably coupled within said nozzle to said lower structure; and a single outer flap coupled to said nozzle assembly, at least one of said ramp flap and said outer flap configured to adjust a throat area of said flade nozzle assembly;

a plurality of tracks coupled to said nozzle assembly, said tracks configured to slidably couple said outer flap to said nozzle assembly;

said outer flap comprising an external surface of said nozzle.

* * * * *